United States Patent [19]

Gandhi et al.

[11] Patent Number: 5,687,287

[45] Date of Patent: Nov. 11, 1997

[54] SPEAKER VERIFICATION METHOD AND APPARATUS USING MIXTURE DECOMPOSITION DISCRIMINATION

[75] Inventors: Malan Bhatki Gandhi, Elk Grove Village; Anand Rangaswamy Setlur, Warrenville; Rafid Antoon Sukkar, Aurora, all of Ill.

[73] Assignee: Lucent Technologies Inc., Murray Hill, N.J.

[21] Appl. No.: 447,307

[22] Filed: May 22, 1995

[51] Int. Cl.$^6$ .................................................. G10L 5/06
[52] U.S. Cl. .......................................... 395/2.56; 395/2.56
[58] Field of Search ..................................... 395/2.52, 2.53, 395/2.65, 2.45, 2.46, 2.47, 2.48, 2.49, 2.6, 2.64, 2.61, 2.56

[56] References Cited

PUBLICATIONS

A. E. Rosenberg et al., "Connected Word Talker Verification Using Whole Word Hidden Markov Models", Proc. 1991 IEEE Int. Conf. on Acoust., Speech and *Signal Processing*, May 1991, pp. 381–384.

A. E. Rosenberg et al., "The Use of Cohort Normalized Scores for Speaker Verification", Proc. 1992 Int. Conf. on Spoken Language Processing, Oct. 1992, pp. 599–602.

C. Liu et al., "Speaker Recognition Based on Minimum Error Discriminative Training", Proc. 1994 IEEE Int. Conf. on Acoust., Speech and Signal Processing, vol. 1, Apr. 1994, pp. 325–328.

J. M. Naik et al., "A Hybrid HMM–MLP Speaker Verification Algorithm for Telephone Speech", Proc. 1994 IEEE Int. Conf. on Acoust., Speech and *Signal Processing*, vol. 1, Apr. 1994, pp. 153–156.

K. R. Farrell et al., "Speaker Identification Using Neural Tree Networks", Proc. *1994 IEEE Int. Conf. on Acoust., Speech and Signal Processing*, vol. 1, Apr. 1994, pp. 165–168.

J. Sorensen et al., "Hierarchical Pattern Classification for High Performance Text–Independent Speaker Verification Systems", Proc. *1994 IEEE Int. Conf. on Acoust., Speech and Signal Processing*, vol. 1, Apr. 1994, pp. 157–160.

L. P. Netsch et al., "Speaker Verification Using Temporal Decorrelation Post–Processing", Proc. *1992 IEEE Int. Conf. on Acoust., Speech and Signal Processing*, vol. 1, Mar. 1992, pp. 181–184.

T. E. Jacobs et al., "A Field Study of Performance Improvements in HMM–based Speaker Verification", Proc. *1994 IEEE IVTTA Workshop*, Sep. 1994, pp. 121–124.

(List continued on next page.)

*Primary Examiner*—Krista M. Zele
*Assistant Examiner*—Scott Wolinsky
*Attorney, Agent, or Firm*—Jack R. Penrod

[57] ABSTRACT

A new speaker verification method, termed Mixture Decomposition Discrimination (MDD), and a new apparatus for using MDD are presented. MDD takes mixture component score information from a speaker independent recognizer and transmits this information while it is still decomposed as a mixture of component scores that indicate the response of the states of a Hidden Markov Model (HMM) before this information is combined into a single speaker independent recognizer parameter. MDD can be very effective in improving the performance of existing verification methods based on speaker dependent HMMs with cohort normalization because the errors of the two speaker verification methods are very uncorrelated statistically. Experimental results have shown that when MDD is incorporated into a system that also uses speaker dependent HMMs, the resulting hybrid system has its average equal error rate reduced by 46% compared to cohort normalized speaker independent HMMs. MDD is used with a speaker dependent linear discriminator which has relatively low computational and storage requirements. Thus, the increased performance of a hybrid MDD-Cohort Normalized HMM system may be achieved with minimal increase in computational and data storage assets.

13 Claims, 4 Drawing Sheets

PUBLICATIONS

J. G. Wilpon et al., "A Modified K–Means Clustering Algorithm for Use in Isolated Work Recognition", *IEEE Trans. on Acoustics, Speech and Signal Processing*, vol. 33, Jun. 1985, pp. 587–594.

A. Higgins et al., "Speaker Verification Using Randomized Phrase Prompting", Digital Signal Processing, Mar. 1991, pp. 89–106.

| EQUAL ERROR RATE COMPARISON | | |
|---|---|---|
| METHOD | MEAN EER (%) | MEDIAN EER (%) |
| MDD | 1.239 | 0.962 |
| CNHMM | 0.473 | 0.227 |
| HYBRID | 0.255 | 0.000 |

*FIG. 5*

SPEAKER VERIFICATION METHOD AND APPARATUS USING MIXTURE DECOMPOSITION DISCRIMINATION

TECHNICAL FIELD

The present invention relates to a method and apparatus for speech recognition and speaker verification, and more particularly to a method and apparatus for speech recognition and speaker verification using speaker independent Hidden Markov Models (HMMs) and a speaker dependent recognizer or verifier.

DESCRIPTION OF THE PRIOR ART

Automatic speaker verification has been a topic of many recent research efforts. Speech modeling using HMMs has been shown to be effective for speaker verification, e.g., "Connected Word Talker Verification Using Whole Word Hidden Markov Models," by A. E. Rosenberg, C.-H. Lee, and S. Gokcen, Proceedings of the 1991 IEEE International Conference on Acoustics, Speech and Signal Processing, pp. 381–384, May 1991. If the verification is performed using utterances consisting of connected word strings, both speaker independent and speaker dependent HMMs are often employed in the verification process. Such a system 100 is shown in FIG. 1. A speaker independent HMM stored in unit 110 is used with a speaker independent automatic speech recognition of connected digits process 112 to recognize and segment the word string of the input speech utterance. Based on this word segmentation, a speaker dependent HMM stored in unit 120 with a speaker verification process 114 then verifies if the word string was indeed spoken by the person claiming a given identity.

The performance of HMM based speaker verification has been shown to improve when either HMM cohort normalization or discriminative training is employed, as described respectively in "The Use of Cohort Normalized Scores for Speaker Verification," by A. E. Rosenberg, C.-H. Lee, B.-H. Juang, and F. K. Soong, Proceedings of the 1992 International Conference on Spoken Language Processing, pp. 599–602, 1992; and "Speaker Recognition Based on Minimum Error Discriminative Training," by C.-S. Liu, C.-H. Lee, B.-H. Juang, and A. E. Rosenberg, Proceedings of the 1994 IEEE International Conference on Acoustics, Speech and Signal Processing, pp. 325–328, Vol. 1, April 1994.

FIG. 2 shows a Cohort Normalized HMM (CNHMM) system 200 which uses a speaker independent HMM stored in unit 210 with a speaker independent recognition unit 212, and a speaker dependent HMM stored in unit 220 with a speaker verification using HMM with Cohort Normalization unit 214. The system 200 operates much the same as the system shown in FIG. 1 with the further refinement of HMM Cohort Normalization, which reduces the overall number of speaker verification errors.

Other methods such as Multi-Layer Perceptron (MLP) and linear discrimination have also been successfully used for speaker verification as described in "A Hybrid HMM-MLP Speaker Verification Algorithm for Telephone Speech," by J. M. Naik and D. M. Lubensky, Proceedings of the 1994 IEEE International Conference on Acoustics, Speech and Signal Processing, pp. 153–156, Vol. 1, April 1994; "Speaker Identification Using Neural Tree Networks," K. R. Farrell and R. J. Mammone, Proceedings of the 1994 IEEE International Conference on Acoustics, Speech and Signal Processing, pp. 165–168, Vol. 1, April 1994; "Hierarchical Pattern Classification for High Performance Text-Independent Speaker Verification Systems," J. Sorensen and M. Savic, Proceedings of the 1994 IEEE International Conference on Acoustics, Speech and Signal Processing, pp. 157–160, Vol. 1, April 1994; and "Speaker Verification Using Temporal Decorrelation Post-Processing," L. P. Netsch and G. R. Doddington, Proceedings of the 1992 IEEE International Conference on Acoustics., Speech and Signal Processing, pp. 181–184, Vol. 1, March 1992. Even with all the above mentioned activity in the speaker verification area, there are still instances of speaker verifiers falsely verifying an impostor posing as the true speaker and falsely refusing to verify a true speaker. Thus, there is a need in the art for an improved method and an improved apparatus for speaker verification. Further, since speaker verification is a type of speaker dependent speech recognition, there is a need in the art for an improved apparatus and method for speaker dependent speech recognition.

SUMMARY OF THE INVENTION

In accordance with the invention, an advance in the speaker verification art is achieved by providing a method and apparatus which use trained speaker independent HMMs corresponding to the vocabulary set of a verifier, such as a connected digit set, in which the speaker independent HMMs are continuous mixture left-to-right HMMs. The method and apparatus of the present invention use the observation that different speakers speaking the same word activate individual HMM state mixture components, differently. Thus a "mixture profile" for a given speaker for that word may be constructed from the mixture information of all states in a given word model. These mixture profiles may then be used as a basis for discriminating between true speakers and impostors, hence the name Mixture Decomposition Discrimination (MDD). MDD when implemented as a process of a computer or similar system provides a heretofore unknown type of speaker verifier that uses the state mixture component to perform speaker verification.

In accordance with another aspect of the invention, the problems of known systems are solved by providing a method of speaker verification. This method includes the steps of: segmenting a speech input with a speaker independent speech recognizer using a first hidden Markov model; recognizing the segmented speech input to obtain an access key to a speaker verification data file of a specific speaker; providing mixture component score information to a linear discriminator; testing a true speaker hypothesis for the specific speaker against an impostor speaker hypothesis for the specific speaker; and determining whether the speech input is from the specific speaker or not according to the scores from the hypothesis testing and predetermined thresholds.

In accordance with yet another aspect of the invention, the problems of the known systems are solved by providing a system for speaker verification of an input word string. This system includes a speaker independent speech recognizer using a first HMM. This speaker independent speech recognizer segments and recognizes the input word string in order to obtain an access key to one of a number of speaker verification data files. A linear discriminator is connected to the speaker independent speech recognizer. Mixture component score information which results from internal processes of the speaker independent speech recognizer in response to the input word string, is provided to the linear discriminator before this mixture component score information is combined into a single parameter. A storage device for storing a number of speaker verification data files, each speaker verification data file containing a true speaker hypothesis for the specific speaker against an impostor speaker hypothesis for the specific speaker, is connected to the linear discriminator. A device for accessing a speaker verification data file associated with the access key from the number of speaker verification data files and transmitting this accessed data file is also connected to the linear discriminator. After the linear discriminator, a determining device, which is connected to an output of the linear discriminator, determines whether the speech input is from the specific speaker or not according to the scores resulting from the testing of the two hypotheses.

BRIEF DESCRIPTION OF THE DRAWING

FIG. 5 is a table of error rates for a cohort normalized HMM, a mixture decomposition discriminator and a combination of both.

DETAILED DESCRIPTION

Figure 1:
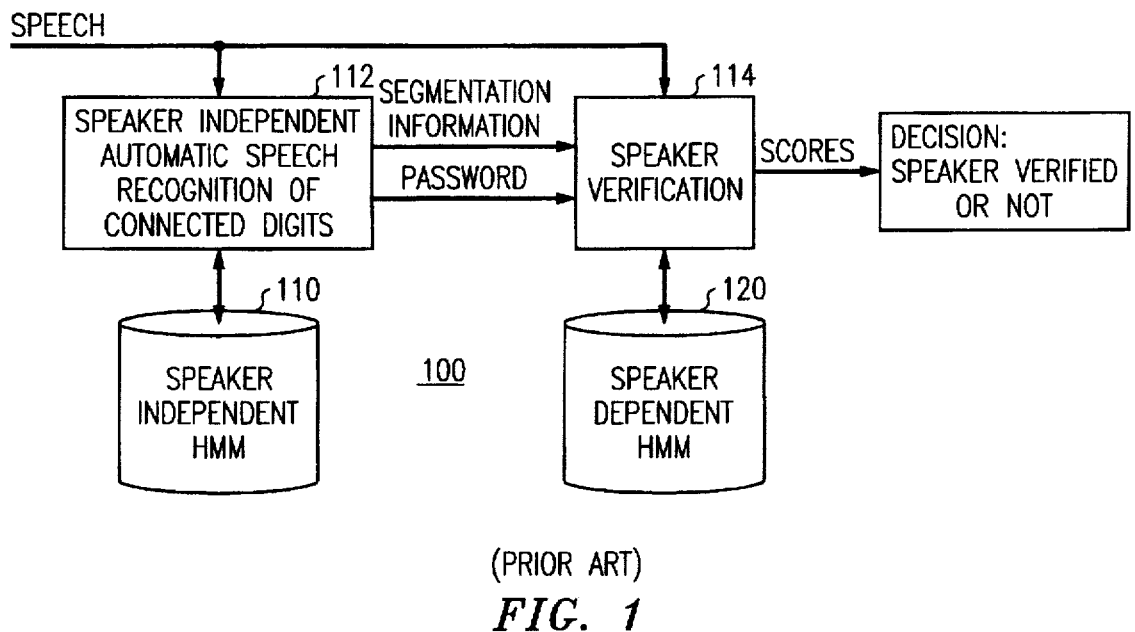
FIG. 1 is a block diagram of a known speaker verification apparatus.
Figure 2:
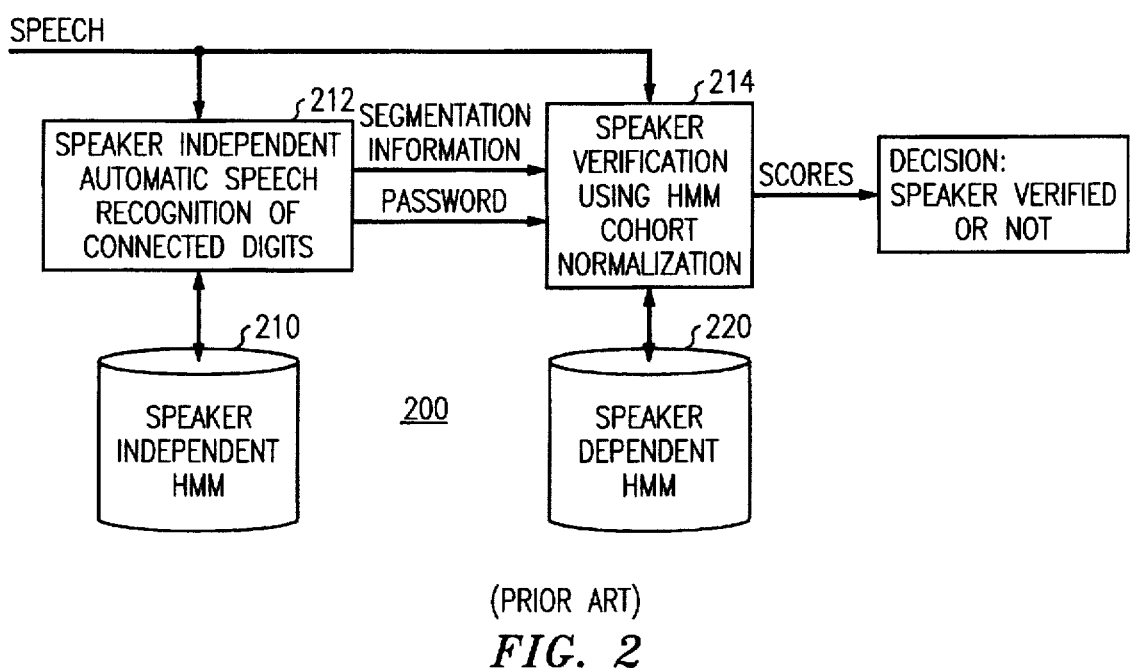
FIG. 2 is a block diagram of another known speaker verification apparatus.
Figure 3:
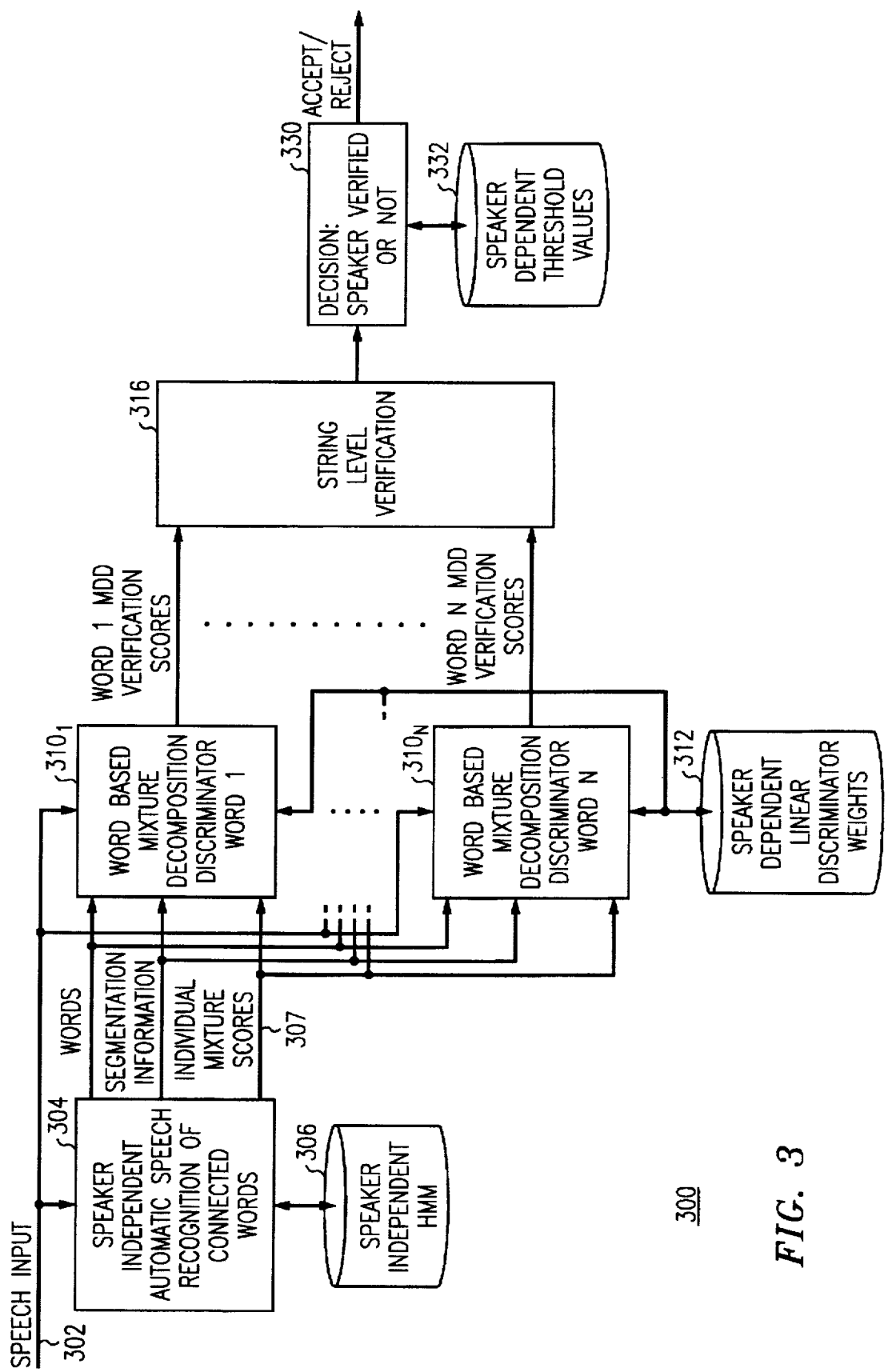
FIG. 3 is a block diagram of a speaker verification apparatus using mixture decomposition discrimination according to the present invention.

Referring now to FIG. 3 a new speaker verification (SV) apparatus 300 is shown. The SV apparatus 300 has a speaker independent (SI) automatic speech recognizer (ASR) 304 which uses SI HMMs from storage unit 306 to perform speech recognition. SI ASR 304 receives input speech that has been transformed by some type of transducer, e.g. a microphone, into corresponding electrical or electromagnetic signals on line 302.

The input speech consists of a string of words constituting the verification password spoken by a speaker claiming to have a certain identity. The SI HMM set consists of models corresponding to a verifier vocabulary set, for example a set of digits. The SI HMM set is stored in storage unit 306. The SI HMM in conjunction with SI ASR 304 performs three functions: 1) recognizing a word string in the input speech, 2) segmenting each input word string, and 3) providing the state mixture component score information for a given word in the string. The SI ASR 304 uses a high performance processor (not shown) and memory (not shown) to perform SI ASR in real time. Such processor and memory arrangements are found in high performance personal computers, workstations, speech processing boards and minicomputers.

The SI word recognition function and the segmenting function are standard for SI ASRs. The third function of providing the state mixture component score information for a given word in the string is a new function, based on a previously existing function. The state mixture component score information is typically generated by a SI HMM ASR, however the information generated is then combined into a single parameter whose value is used in the HMM ASR. The present invention extracts this state mixture component score information before it is combined while it is still decomposed and inputs it via line 307 into word based mixture decomposition discriminators (MDD) $310_1$–$310_N$.

The SI HMMs stored in unit 306 that are used by SI ASR 304 have been trained for the vocabulary set, which may be words of any kind, but HMMs for connected digits are well developed because of credit card and debit card personal identification number ASR systems. The SI HMMs are the continuous mixture left-to-right type. The state mixture components of previous SI HMMs were lumped together to form a single parameter during the SI recognition process. The inventors discovered that different speakers speaking the same word would activate the state mixture components of the HMM differently, and if the mixture information of all states in a given word model is considered, a "mixture profile" can be constructed of a given speaker for that word. This mixture profile can then used as a basis for discriminating between true speakers and impostors. Thus the present invention changes the previously known SI HMMs to extract and forward mixture component score information before the information is lumped together.

This mixture component score information is incorporated into each discriminator $310_1$–$310_N$ that tests the true speaker hypothesis against the impostor hypothesis. The verification models are, therefore, the speaker-specific discriminator weight vectors which are determined or trained for each speaker. These weight factors, whose storage requirements are relatively small, are stored in storage unit 312. Further, since discriminators $310_1$–$310_N$ are linear discriminators, the computational complexity of MDDs is also relatively low and so are the computational resources required.

The MDD speaker verification process has two portions: a word level speaker verification portion followed by a string level speaker verification portion. These two portions are performed in word level speaker discriminators $310_1$–$310_N$ and discriminator weights stored in unit 312, and string level speaker verifier 316, respectively. The word level speaker discriminators $310_1$–$310_N$ and discrimination weight factors stored in unit 312, and the string level speaker verifier 316, each use high performance processors and memories just as the ASR 304 uses, in fact if the processor and memory used by ASR 304 together have sufficient processing power and storage, the ASR 304, the word level speaker verifiers $310_1$–$310_N$ and the string level speaker verifier 316 could all use the same processor, memory and storage arrangement.

Each word in the string is segmented by the SI HMM ASR 304 and is then operated upon by a respective speaker verifier of speaker discriminators $310_1$–$310_N$. The string level verification process combines the results of the word level verification process to make a final accept/reject decision by unit 330. Storage unit 332 stores threshold values used by decision unit 330 to determine if the spoken string of words has a sufficiently high score to be accepted or rejected. This method for string verification will be described later. The output of decision unit 330 is either an accept or reject signal.

Word verification is a type of classification or pattern recognition. In any classification or pattern recognition problem dealing with time sequences, it is desirable to time-normalize the signal so that it can be represented by a fixed number of parameters. The fact that the HMM time-normalizes each word in the input utterance into a fixed sequence of states allows the representation of a given word by a fixed length vector called a feature vector for reasons that will be described later. The HMM normalization (or state segmentation) assigns each frame in the input utterance to a particular HMM state. To obtain the mixture component contribution into a feature vector, the centroids of all mixture components for a given state are computed over the frames that are segmented into that particular state. The feature vector is formed by concatenating the mixture centroid vectors of all states in a given word. Mathematically, the multi-dimensional mixture distribution for a given state is:

$$p(O|S_{i,j}) = \sum_{m=1}^{M} \kappa_{i,j,m} N(O; \mu_{i,j,m}, \Sigma_{i,j,m})$$

where O is the recognizer observation vector, $S_{ij}$ is the j th state of the i th word model, M is the total number of Gaussian mixture distributions, and $\kappa_{i,j,m}$ is the mixture weight. The elements of the mixture state centroid vectors are given by:

$$c_{i,j}(m) = \frac{1}{q_2 - q_1} \sum_{q=q_1}^{q_2} \kappa_{i,j,m} N(O_q; \mu_{i,j,m}, \Sigma_{i,j,m}) \ 1 \leq m \leq M,$$

where $q_1$ and $q_2$ are the start and end frames of the input speech segment that was segmented into state j of word i, and $O_q$ is the recognizer observation vector for frame q. The word level verifier feature vector, $x_i$, is the concatenation of the centroid vectors, $c_{i,j}$, as follows, $$x_i = [c_{i,1}^T c_{i,2}^T \ldots c_{i,N_i}^T]$$

where $N_i$ is the number of states in word model i, and the superscript T refers to a vector transpose. Therefore, the dimension of $x_i$ is $N_i \times M$. Word level verification is performed by computing the value of a linear discriminate function written as:

$$R(a_{i,k}, x_i) = a_{i,k}^T x_i$$

where $a_{i,k}$ is a weight vector representing the linear discriminator model for speaker k speaking word i. If a speaker claims the identity of speaker k, the word level verification score is determined by computing $R(a_{i,k}, x_i)$.

The set of discriminator weight vectors, $\{a_{i,k}\}$, is determined using Fisher's discrimination criterion as described in *Multivariate Analysis* by R. Mardia, J. Kent and J. Bibby, Academic Press (1979). For a given word i and speaker k, Fisher's criterion is applied to discriminate between two classes: one class represents the case of word i spoken by the true speaker k, and the other class is the case of word i spoken by speakers other than speaker k (i.e., impostors). Let $x_{i,k}$ be the discrimination vector for word i spoken by the true speaker k. Further, let $x_{i,k'}$ be the discrimination vector for word i spoken by speakers other than the true speaker k. The discriminator weight vector $a_{i,k}$ is obtained according to Fisher's criterion by maximizing the ratio of the between-classes sum of squares to the within-classes sum of squares. Specifically, the ratio can be written as $$T(a_{i,k}) = \frac{a_{i,k}^T B_{i,k} a_{i,k}}{a_{i,k}^T W_{i,k} a_{i,k}},$$

where $$B_{i,k} = \overline{x}_{i,k} - \overline{x}_{i,k'}][\overline{x}_{i,k} - \overline{x}_{i,k'}]^T, \ W_{i,k} = S_{i,k} + S_{i,k'},$$

and $S_{i,k}$ and $S_{i,k'}$ are the covariance matrices of $x_{i,k}$ and $x_{i,k'}$, respectively.

It can be shown that the vector $a_{i,k}$ that maximizes the ratio $T(a_{i,k})$ is given by the eigenvector corresponding to the largest eigenvalue of the matrix $W^{-1}B$. For a two class discrimination, the matrix $W^{-1}B$ has only one non-zero eigenvalue. The corresponding eigenvector is, therefore, the solution that maximizes $T(a_{i,k})$, and can be written as $$a_{i,k} = W^{-1} d,$$

where $$d = \overline{x}_{i,k} - \overline{x}_{i,k'}.$$

As can be seen from the last two equations, the determination of $a_{i,k}$ requires training exemplars of both the true speaker, k, and impostors of k speaking word i. The impostor data can be readily simulated in certain verification applications where all the enrolled speakers use a common set of words to construct their passwords. An example of this is verification using connected digit strings. In this case, the digits are the common word set, and the impostor trig data for speaker k can be considered to be all or a portion of the training digit strings spoken by the other enrolled speakers. If personalized passwords are used, then an impostor data collection would be necessary in order to carry out the discrimination.

String level verification is performed simply by averaging the word level verification scores over all the words in the string. Therefore, the string level verification score can be written as $$V_k^{(mdd)} = \frac{1}{P} \sum_{p=1}^{P} R(a_{f(p),k}, x_{f(p)}).$$

where P is the number of keywords in the string, and f(p) is word index of the p th word in the string. The accept/reject decision is performed by comparing $V_k^{(mdd)}$ to a threshold.

As can be concluded from last equations, MDD's verification model for a given speaker, k, consists of the vectors $a_{i,k}$ corresponding to all the words in the verification vocabulary of that speaker. Each vector has $N_i \times M$ elements. Typical values for $N_i$ and M are $N_i = 10$ and $M = 16$. Using a connected digit verification scenario as an example where the verification word set consists of 11 words (0–9, oh), the complete verification model for one speaker is represented by 1760 parameters. The computational requirements for MDD consists of a series of dot products and one sum.

A hybrid approach that combines MDD and CNHMM methods in a combined verification system can significantly outperform the individual approaches, because the errors made by the individual approaches are, in general, uncorrelated. In order to combine these two approaches into one system requires that the outputs of the two methods be combined in some manner to arrive at a single verification parameter. Notice that the computational requirements of the MDD method are so low that a CNHMM method may be added without burdening the overall system. This is in part because all of the input needed for the CNHMM is already segmented while processing an input utterance with the SI HMM.

Figure 4:
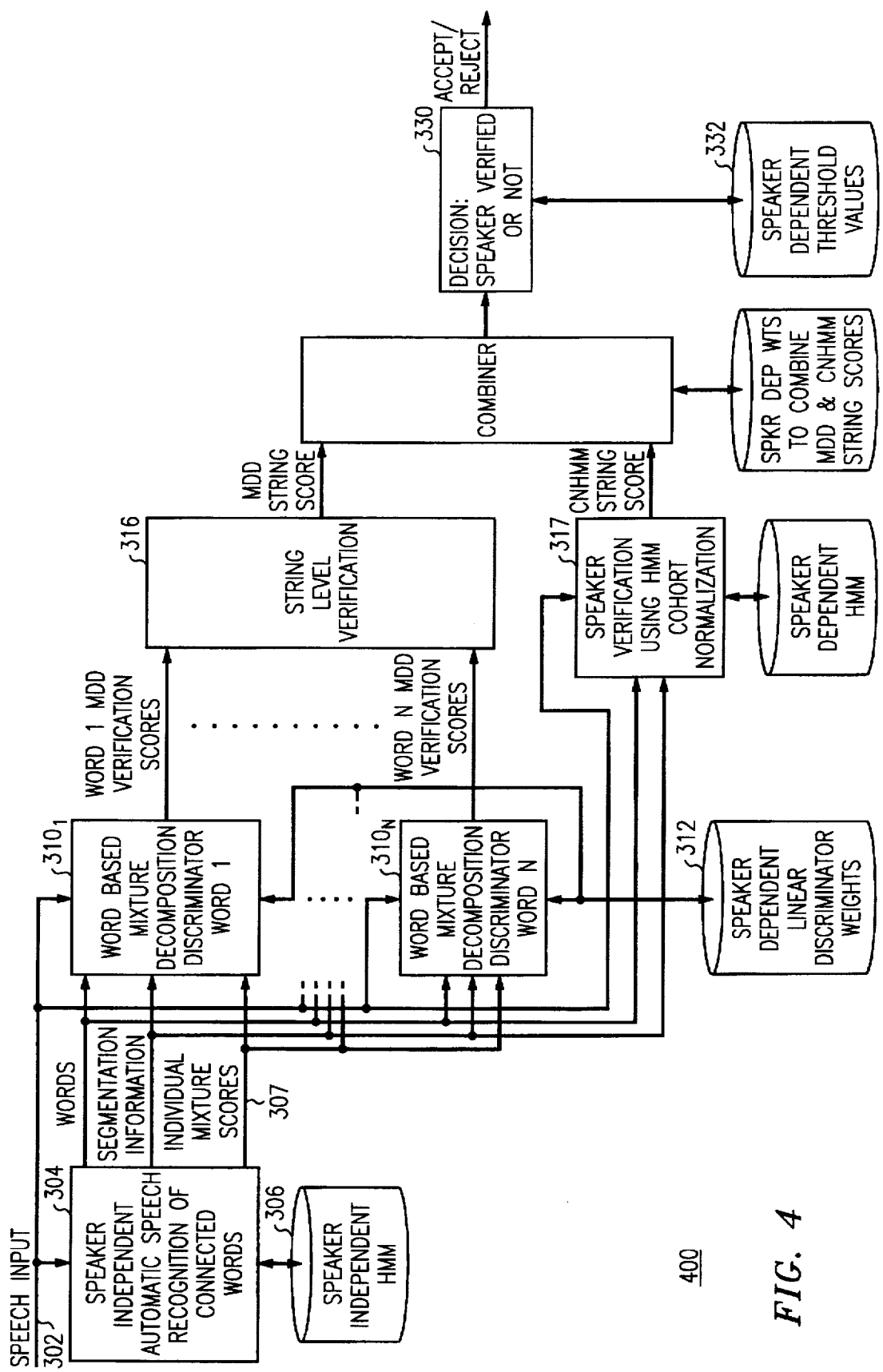
FIG. 4 is a block diagram of a speaker verification apparatus that uses a combination of mixture decomposition discrimination and cohort normalized HMM.

The Hybrid System, shown in FIG. 4, combines the cohort-normalized HMM score and the MDD score for a given test string to arrive at an overall verification score. The combined verification score is given by:

$$V_k = b_k^{(cnhmm)} V_k^{(cnhmm)} + b_k^{(mdd)} V_k^{(mdd)}$$

where $b_k^{(cnhmm)}$ and $b_k^{(mdd)}$ are speaker-specific weighting factors determined as part of the training phase. These weights are determined through a discriminate analysis procedure similar to the one used to determine the MDD weight vectors $\{a_{i,k}\}$. Here, however, the discrimination vector consists of two elements, namely $V_k^{(cnhmm)}$ and $V_k^{(mdd)}$. Again, Fisher's discrimination criterion is employed to discriminate between two classes of strings:

strings spoken by speaker k and strings spoken by impostors of each speaker k.

Training the speaker dependent HMMs used in unit 317 starts by segmenting the training utterances for a given speaker into individual word segments using a speaker independent HMM. This speaker independent model is the same one used in the MDD approach described earlier. The individual word segments are then segmented into states with the initial state segmentation being linear. Observation vectors within each state are clustered using a K-means clustering algorithm, such as described in "A modified K-Means clustering algorithm for use in isolated words," by J. G. Wilpon and L. R. Rabiner, IEEE Transactions on Acoustics, Speech and Signal Processing, Vol. 33, pp. 587–594, June 1985. The resulting model is used to resegment the states of each training word using a Viterbi search. This process of state segmentation followed by K-means clustering is repeated a few times. Typically, three iterations are usually sufficient for the average model likelihood to converge after an initial linear state segmentation. Model variance estimates are usually poor due to limited training data for any given speaker. It was found experimentally, that fixing the model variances to the mean variance averaged over all the words, states, and mixtures for a given speaker yielded the best results.

The verification process uses the fixed variance speaker dependent HMMs, and speaker independent HMM with a constrained grammar to segment the test utterances into words. A duration normalized likelihood score is computed for each word in the input string. The word likelihood scores of non-silence words are averaged together to arrive at the string likelihood score for the test utterance.

Cohort normalization serves as a way to establish a log likelihood ratio type test. It has been shown that cohort normalization improves verification performance significantly when compared to a maximum likelihood approach. In this work, the cohort models are considered to be the speaker independent HMM, implying that all speakers share the same cohort model.

This choice of cohort models alleviates the need to define speaker-specific cohort speakers. The cohort string likelihood score is computed in the same way the speaker dependent string likelihood score was computed. Taking the log of the string likelihood ratio results in a string log likelihood difference which can be written as $$V_k^{(cnhmm)} = \frac{1}{P} \sum_{p=1}^{P} \log[L(O|\lambda_{f(p),k})] - \log[L(O|\lambda_{f(p),c})]$$

where O, P and f(p) are defined earlier, $\log L(O|\lambda_{f(p),k})$ is the duration-normalized likelihood of speaker k's HMM model for word f(p), and $\log[L(O|\lambda_{f(p),c})]$ is the duration-normalized likelihood of the speaker independent cohort model. If CNHMM is used alone in the verification, then the verification is performed by comparing $V_k^{(cnhmm)}$ to a threshold to make the accept/reject decision.

The verification performance was tested using the YOHO speaker verification corpus, available from the Linguistic Data Consortium (LDC). This corpus was chosen since it is one of the largest known "supervised" speaker verification databases. The LDC YOHO corpus is packaged onto one CD-ROM which also includes a complete database description. Some important features are summarized here. "Combination lock" triplets (e.g., twenty-six, eighty- one, fifty-seven). 138 subjects: 106 males, 32 females. 96 enrollment triplets per subject collected over 4 enrollment sessions. 40 random test triplets per subject collected over 10 verification sessions. Data in the corpus was collected over a 3-month period. An 8 kHz sampling with 3.8 kHz bandwidth was used. Data collection was strictly supervised collection in an office environment setting, and a high quality telephone handset (such as a Shure XTH-383) was used to collect all speech.

A feature extraction process (not shown in the figures) either preprocesses the input speech on line 302 as a separate stage or is apart of the SI recognition unit 304. The feature extraction process computes a set of 38 features every 15 msec. The feature vector consists of 12 LPC cepstral coefficients, 12 delta cepstrals, 12 delta-delta cepstrals, delta log energy and delta-delta log energy. The word model set was considered to consist of 18 models to cover the YOHO data vocabulary. The 18 models correspond to: "one", "two", ..., "seven", "nine", "twen", "thir", ..., "nin", "ty", and "silence." The speaker independent HMMs were trained with 8–10 states except for "ty" and "silence" which were trained using only 3 states. The distribution for each state is represented by a weighted sum of Gaussian mixtures, where the number of mixtures was set to 16. The speaker dependent HMM training which was discussed in Section 3 used a lower number of mixtures, typically between 4 and 10. The per speaker MDD model set consisted of 17 (excluding silence) discriminator weight vectors. With 16 mixture components per speaker independent HMM state, the dimension of the MDD model vector ranges from 48 for the 3-state "ty" model to 160 for a 10-state model.

The SI HMM was trained using triplets from the enrollment set of all 138 male and female speakers. Specifically, the first 24 enrollment triplets of each speaker were used for this training, resulting in a total of 3312 training utterances. After the speaker independent HMM was trained, the 106 speaker set was randomly divided into two sets: 81 speakers who were considered to be subscribers, and 25 speakers who were considered to be non-subscribers. Given the fact that MDD involves a discriminative training procedure, the main purpose of the non-subscriber set is to provide for a fair testing scenario where the impostor speakers used in the training phase are different from those used in the verification. All of the non-subscriber speech was considered to be, in effect, a development set that was used only in the training phase. No portion of the non-subscriber speech was used in the verification testing phase. As mentioned above, each speaker has two sets of triplets, an enrollment set and a verification set. We will now describe how this data was used in the training of MDD, CNHMM, and the Hybrid System.

MDD Training: For each subscriber, we used all of his 96 enrollment triplets as the true speaker training utterances. The impostor training utterances were considered to be all the enrollment utterances of the 25 non-subscribers. Therefore, the 81 subscribers shared the same impostor training set, where the number of impostor utterances was 2400.

CNHMM Training: For each subscriber, we used all of his 96 enrollment triplets to train the speaker dependent HMM model. Unlike the MDD method, speech from the 25 non-subscribers was not needed in the training phase for this method.

Hybrid System Training: This training consisted of applying Fisher's discrimination criterion on true speaker and impostor utterance classes with respect to the CNHMM and MDD scores for each utterance (i.e., triplet). Since true speaker test utterances are not available in the training phase, the subscriber enrollment utterances were reused here to represent the true speaker speech. This implies that the MDD and CNHMM verification scores used in the Hybrid System training are unrealistic because they represent scores of a "self test" on the MDD and CNHMM models. These "self test" true speaker scores are biased optimistically and do not capture the intra-speaker variability. Since Fisher's criterion requires only means and variances of the discrimination feature vector, this problem can be somewhat mitigated by artificially adjusting the means and variances to reflect a more realistic intra-speaker variability. A small side experiment was conducted to estimate the adjustment in the means and variances of $V_k^{(cnhmm)}$ and $V_k^{(mdd)}$ using the non-subscriber enrollment and verification speech. This side experiment consisted of generating MDD and CNHMM models for the non-subscribers and determining the bias in verification scores between their enrollment and verification sets. The impostor trig set for the Hybrid System was considered to be 4 verification triplets from each of the 25 non-subscribers. No adjustment of the means and variances of the impostor scores is necessary since the verification triplets for non-subscribers are not used by either the MDD or the CNHMM training phases and so are not biased.

The verification testing procedure used was common for all three methods. For each subscriber, his 40 verification triplets were considered to be the true speaker speech. The impostor speech was considered to be the triplets from the verification set of all of the other 80 subscribers. Since this represents too large a number of impostor utterances per subscriber, it was pruned to be only the first 10 triplets from each of the 80 impostors. Thus, the number of impostor utterances for each subscriber was 800. As the above data organization description indicates, every effort was made throughout all of the experiments to keep the verification testing phase very fair. For example, the impostor set for training purposes was a random subset of the complete set of 106 speakers, and the testing impostor set had no common speakers with the training impostor set. Also, no information from the subscriber verification utterances was used in any training phase.

The verification performance of the three methods, MDD, CNHMM, and the Hybrid System can be compared using Receiver Operator Characteristics (ROC) measurements. ROC measurements measure the false acceptance rate (Type II error) and the false rejection rate (Type I error). The ROC measurement data is also used to compute the Equal Error Rate (EER) for each method on a per Speaker basis.

FIG. 5 shows the mean and median values of the EER for each of the three methods. This table shows that the mean EER is reduced from 0.473% for the CNHMM method to 0.225% for the Hybrid System, a 46% improvement. The median EER dropped to 0% from 0.227%. It was also observed that the Hybrid System resulted in lower EER than both CNHMM and MDD for 45 out of the 81 subscribers. For only 8 subscribers, one of the two individual methods resulted in a marginally lower EER than the Hybrid System. For the remaining 28 subscribers, the ERR of the Hybrid System was equal to the smaller of the two EERs corresponding to MDD and CNHMM.

Test results indicate that the Hybrid System 400 significantly outperforms either one of the individual methods. This is a general indication that most verification errors made by one method are not common to the other method, and that by using the two methods in the hybrid system 400, overall performance is improved.

In a more quantitative test, the correlation of the verification errors made by the two methods was evaluated by a $x^2$ (Chi-square) test, and the result indicated that the errors of the MDD method are highly uncorrelated with respect to the errors of the CNHMM method.

Thus, it will be appreciated that a new speaker verification method, termed Mixture Decomposition Discrimination, has been disclosed. An apparatus for using MDD has also been disclosed. While the invention has been particularly illustrated and described with reference to preferred embodiments thereof, it will be understood by those skilled in the art that various changes in form, details, and applications may be made therein. For example, an adaptation of the method and apparatus that uses subword recognition instead of word recognition. It is accordingly intended that the appended claims shall cover all such changes in form, details and applications which do not depart from the true spirit and scope of the invention.

The invention claimed is:

1. An apparatus for speaker verification of an input word string, comprising:
    a speaker independent speech recognizer using a first hidden Markov model (HMM), said speaker independent speech recognizer segmenting and recognizing said input word string to obtain an access key to a speaker verification data file of a specific speaker from a plurality of speaker verification data files;
    a linear discriminator;
    means for providing mixture component score information from internal processes of said speaker independent speech recognizer to said linear discriminator before said mixture component score information is combined into a single quantity;
    means for storing a plurality of speaker verification data files, each speaker verification data file containing a true speaker hypothesis or model for each respective speaker is developed by testing against a respective impostor speaker hypothesis or model;
    means for accessing a speaker verification data file associated with said access key from said plurality of speaker verification data files and transmitting said accessed data file to said linear discriminator;
    said linear discriminator processing said accessed speaker verification data file to generate a plurality of word verification scores; and
    means for determining whether the speech input is from the specific speaker or not according to the plurality of word verification scores.

2. The apparatus according to claim 1, wherein said input word string is a plurality of words and digits.

3. The apparatus according to claim 1, wherein said input word string is a plurality of digits.

4. The apparatus according to claim 3, wherein said speaker independent speech recognizer recognizes connected digits.

5. The apparatus according to claim 1, wherein each of said plurality of speaker verification data files is trained using mixture component score information from speech of a respective true speaker associated with the file and corresponding impostor speech, said training results in speaker dependent weights that are used by said linear discriminator for speaker verification.

6. The apparatus according to claim 1, wherein said means for determining whether the speech input is from the specific speaker or not according to the scores resulting from the hypothesis or model testing using linear discrimination includes predetermined thresholds.

7. The apparatus according to claim 1, further comprising:
    speaker dependent verification means for using a plurality of cohort normalized HMMs connected to said speaker independent speech recognizer that uses the first HMM;

said speaker dependent verification means receives said segments of said input word string and said access key from said speaker independent speech recognizer;

said speaker dependent verification means uses said access key to access a specific cohort normalized HMM from said plurality of cohort normalized HMMs and uses said specific cohort normalized HMM to obtain cohort normalized HMM scores for said input word string; and means for combining said cohort normalized HMM scores with said word verification scores to verify or not verify a specific speaker.

8. A method of speaker verification, comprising the steps of:

segmenting a speech input with a speaker independent speech recognizer using a first hidden Markov model;

recognizing the segmented speech input to obtain an access key to a speaker verification data file of a specific speaker;

providing mixture component score information to a linear discriminator;

testing a true speaker hypothesis for the specific speaker against an impostor speaker hypothesis for the sped fie speaker; and determining whether the speech input is from the specific speaker or not according to discrimination scores from the hypothesis testing and predetermined thresholds.

9. The method of claim 8, further comprising the step of:

before said testing step, determining linear discrimination weights for the true speaker hypothesis and the impostor speaker hypothesis for the specific speaker.

10. A method for speaker verification from input speech that has been converted into electrical signals, comprising the steps of:

segmenting an input word string from the input speech;

recognizing said word string by a speaker independent hidden Markov model (HMM) recognizer;

providing said word string as a group of recognized words to a speaker dependent recognizer;

outputting alphanumeric characters representing each word of said word string that is recognized;

providing state mixture component score information from said speaker independent HMM recognizer for each word in the string to a mixture decomposition discriminator; and using said mixture component score information for speaker verification.

11. The method of claim 10, further comprising the step of:

after the outputting of alphanumeric characters step, using said alphanumeric characters to access speaker dependent data for the mixture decomposition discriminator.

12. A method for speaker verification from input speech that has been converted into electrical signals, comprising the steps of:

segmenting an input word string from the input speech;

recognizing said word string by a speaker independent hidden Markov model (HMM) recognizer;

outputting alphanumeric characters representing each word of said word string that is recognized;

providing state mixture component score information from said speaker independent HMM recognizer for a given word in the string to a mixture decomposition discriminator; and using said mixture component score information for speaker verification.

13. The method of claim 12, further comprising the steps of:

providing said segmented input word string from the speaker independent HMM recognizer to a speaker verification unit using a cohort normalized HMM;

providing said alphanumeric characters to said speaker verification unit using a speaker dependent cohort normalized HMM recognizer;

using said alphanumeric characters to access speaker dependent data of said cohort normalized HMM that is associated with said alphanumeric characters;

determining speaker verification scores according to said cohort normalized HMM; and using said speaker verification scores of said cohort normalized HMM in combination with said mixture component score information for speaker verification.

* * * * *